May 20, 1930. E. F. BEGTRUP Re. 17,671

METHOD AND MEANS FOR THE ALUMINO THERMIC WELDING OF RAILS AND THE LIKE

Original Filed April 3, 1929 2 Sheets-Sheet 1

Inventor

Edward F. Begtrup

By his Attorney

Inventor
Edward F. Begtrup
By his Attorney
Chas. T. Adams

Reissued May 20, 1930 Re. 17,671

UNITED STATES PATENT OFFICE

EDWARD F. BEGTRUP, OF JERSEY CITY, NEW JERSEY, ASSIGNOR TO METAL AND THERMIT CORPORATION, OF CARTERET, NEW JERSEY, A CORPORATION OF NEW JERSEY

METHOD AND MEANS FOR THE ALUMINO-THERMIC WELDING OF RAILS AND THE LIKE

Original No. 1,741,399, dated December 31, 1929, Serial No. 352,096, filed April 3, 1929. Application for reissue filed March 24, 1930. Serial No. 438,617.

The invention relates to improvements in method and means for effecting the welding of railway rails and more particularly to the formation of combined fusion and pressure welds between the ends of relatively heavy rails, the primary object of the invention being to effectively shield the tread and gauge faces of the rail ends immediately at the joint from contact with the superheated slag, so that the heat delivered by the latter may be effective in raising the temperature of the rail heads to a point which will enable the head sections to be pressure welded effectively throughout, without washing away or impairing the wearing faces of the rail ends.

A suitable mold for carrying out the method and embodying the characteristic features of the invention is illustrated in the accompanying drawings, in which:—

Figure 1:
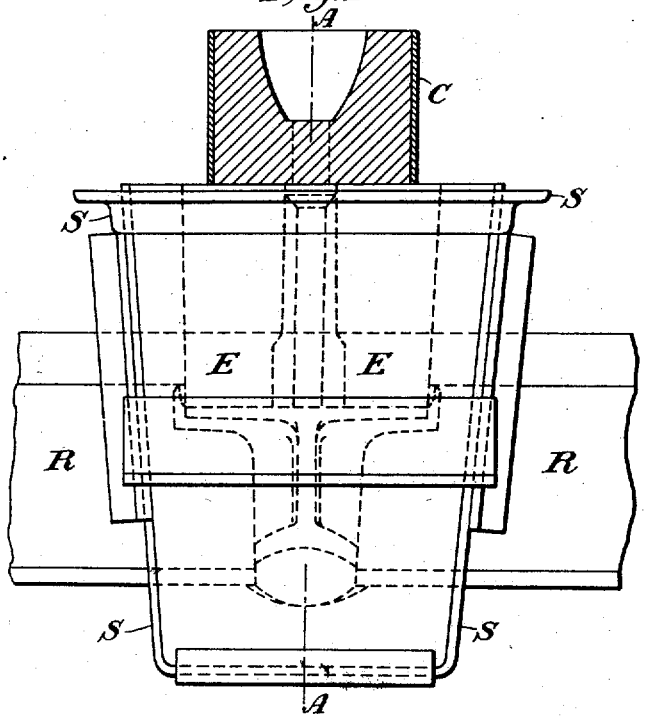
Fig. 1 is a side elevation of the mold.
Figure 4:
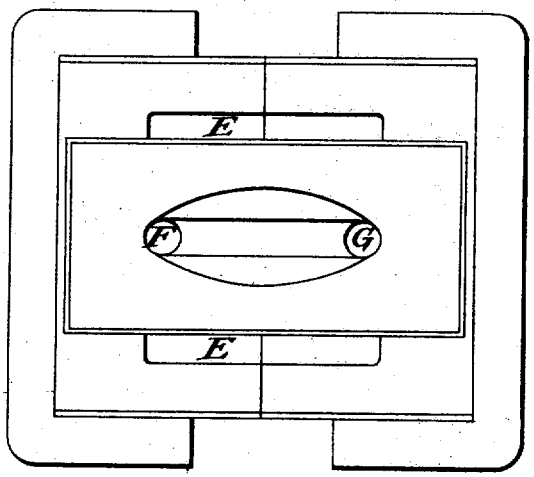
Fig. 4 is a plan view of the mold.

The alumino-thermic welding of rail ends is effected in a number of different ways, including, first, the full fusion weld in which the rail ends are separated slightly and the space between and around the ends of the rails filled with superheated molten steel, generated in the alumino-thermic reaction, which steel melts the rail ends with which it comes in contact and locally recasts them; second, the so-called "insert" weld, which involves either the application of a separate insert or spacer, as shown in the patent to Lange No. 1,153,435, or the attached insert or spacer, as disclosed in the patent to Barnes No. 1,490,579, in which the head of one or both rails is undercut by the removal of a portion of the web and base so that the overhanging head or heads will constitute the spacing means, whereby the heads will be pressure welded and the webs and bases will be fusion welded by the alumino-thermic products; and third, the fusion welding of the bases and webs of the rail ends and a complete pressure weld between the entire faces of the ends of the rail heads enclosed within the mold, which pressure weld usually extends downward from the head to include relatively small areas of the webs of the rail ends.

This last type of welding rails has been in general practice on the continent of Europe for many years, but has found little favor or application in this country, because of the necessity of employing relatively heavy clamps, weighing from 400 to 500 lbs., to force the rail ends together during the welding operation, and for the further reason that the joints must be made successively, because, as each joint is finished, the rail ahead must be moved up to allow for the metal used in making the pressure weld, that is to say, to compensate for the movement of the welded rails toward each other by the clamping mechanism. These features, therefore, materially limit the production of this type of welded joints and such joints can be installed only where the track is exposed for its entire length, so that the necessary movement of the rails in effecting the weld and to compensate for the spaces left between the welded rails and the succeeding rails, may be accomplished.

In general, this last type of weld is made by machining the faces of the heads of the rail ends to bring them into parallelism and to render the surfaces clean and bright, and undercutting the web and base portions, so that, when the machined heads are butted together, the webs and bases will be about ½″ apart; then a heavy clamp is placed on these rail ends, secured to the rails, and the means carried by the clamps for forcing the rail ends into butting relation are operated. A two part mold is then put into position surrounding the rail ends, which mold provides a space about the ends of the rails, which space defines the joint or weld after said space has been filled with the superheated thermit steel and slag. Entering the mold at the bottom of this space is a preheating gate. In the European practice, the mold space is designed so as to form the usual collar of thermit steel around the bases and webs of the rails, and the upper portion of the mold about the heads of the rails is open. This upper open portion is filled with the alumino-thermic slag, which coming into contact with the head portions of the rails, heats them to a temperature at which these head portions can be pressure welded, when forced together by the clamps, and, at the same time, the web and base portions of the rails are fusion welded by the alumino-thermic steel. It is obvious that this alumino-thermic steel and slag are both formed in the same reaction, and the steel being tapped into the mold first through a fin or gate at the side of the mold, naturally fills the mold space surrounding the bases and webs of the rail ends, and the slag, which follows, completes the filling of the mold, so as to surround or envelope the head portions of the rails.

In attempting to apply this combined pressure and fusion welding method to railway rails in this country, difficulties were encountered which were apparently insurmountable. In Europe, the rail sections are considerably lighter than in this country and the steel used in the making of these rails is lower in carbon and the rails, therefore, are softer and more readily pressure welded. The heaviest T-rail section used abroad weighs only about 105 lbs. per yard, whereas, with the heavy rolling stock and equipment used on railroads in this country, T-rails weighing 134 lbs. per yard are in common use and much heavier rails, up to 200 lbs. per yard, are in contemplation to meet the exigencies of the increasing weight of rolling stock and equipment. Further, on account of the lighter weight equipment in use abroad, the steel of their rails contains only about .40 carbon; whereas the rails in the United States contain from .70 to .90 carbon. Because of these conditions, when it was attempted to apply the European practice to American rails, it was found practically impossible to provide sufficient heat in the slag surrounding the head portions of the rails enclosed in the mold, to cause a uniform pressure weld extending entirely through the head portions, without having so much heat delivered to the outside fibers of the rail heads, immediately at the joint, as to fuse and actually wash away the contacted surfaces of the rail heads. Every obvious means for obviating this difficulty has been tried, such, for example, by so designing the space in the top of the mold about the rail heads that the slag would not be so concentrated at the joint itself, but would cover the rail heads for a considerable length; but no matter what proportions, as to width, depth and length of slag chamber, were employed, the results were always the same, and no pressure weld at the centers of the head portions could be obtained, because of the insufficient heat at this point, or, when this heat was increased sufficiently to cause a pressure weld throughout the contacting head ends, the outer surface of the rail heads, including the tread and gauge faces, would be more or less washed away and the contour of the rails would be destroyed. It has been found, however, that by designing the portion of the mold that surrounds the head portions of the rail ends, so that the tread and gauge surfaces of the heads immediately at the joint were shielded from contact with the molten slag, while the under faces of the rail heads within the mold were freely open to contact with the slag, the heat delivered to the tread and gauge faces of the rail heads would be reduced, so that fusion of these faces would be avoided, and, at the same time, the heat of the slag would be delivered to the rail heads by contact with the lower surfaces of the latter and the entire surfaces of the heads laterally of the meeting faces, in sufficient quantity to raise the temperature of the rail heads to effective pressure welding temperature, so that a thorough homogeneous pressure weld between the heads of even the heaviest rails can be effected and the wearing faces of the rail heads will be preserved and left wholly unimpaired.

The accompanying drawings illustrate a typical mold involving the invention and by means of which the new method of effecting these composite pressure and fusion welds may be readily carried out. The particular mold illustrated is exemplary of that employed in welding heavy T-rails, but it will be understood that both the novel mold and the method are applicable to the usual tram or groove type of rail.

Referring to the drawings, R indicates the ends of the rails, which are enclosed in the two part mold M, having a surrounding sheet iron flask or casing S, the top of the mold being provided with a pouring cope C. The collar defining space surrounding the bases and webs of the rail ends is indicated at D and the slag basin at E. Pouring gates F and G are disposed in the respective halves of the mold and communicate with corresponding outlets in the bottom of the cope.

Figure 3:
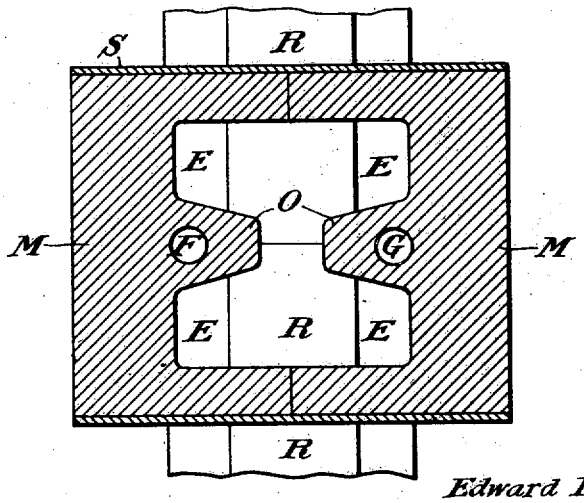
Fig. 3 is a horizontal section on line B—B of Fig. 2.

Instead of the slag basin being wholly open to the top of the mold, the respective halves of the mold are extended as tongue-like projections O (see Fig. 3) toward the longitudinal axis, so that the interior walls of the mold are in juxtaposition to or in immediate contact with the top and side surfaces or the tread and gauge faces of the rail heads, as indicated at M′, M′, at or about the butted ends, and only the bottom surfaces and the surfaces of the rails laterally of the mold extensions O are exposed to the molten slag.

Figure 2:
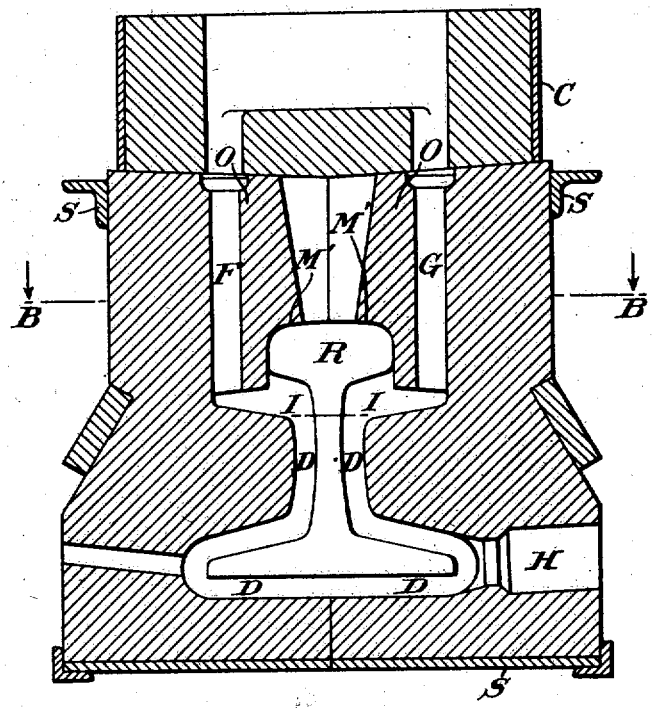
Fig. 2 is a section on line A—A of Fig. 1.

In making this type of composite rail weld, the cope C is mounted in the top of the mold and the thermit crucible is disposed over the center of the cope C, so that, when the superheated steel and slag is tapped into the cope, the stream of molten metal will divide, part of it going down pouring gate F and part down pouring gate G. This division of the molten steel is important, in that both sides of the weld will be fed at the same time and the level of the steel collar will be the same on both sides and the superheated molten slag will be distributed uniformly also in the slag basin, filling the latter and the pouring gates. The thermit charge is so proportioned that the steel content will fill the mold to a point from one-half to one inch below the head portions of the rails, as indicated at I, I in Fig. 2. The entire rail sections within the mold space above this line I, I are in contact with the superheated slag, so that all of the lower faces of the rail ends within the mold cavity are in direct contact with this molten slag, but none of the latter comes in contact with those portions of the tread and gauge faces of the rail ends which are shielded by the walls of the mold lying adjacent thereto or in immediate contact therewith. The superheated steel coming in contact with the web and base portions of the rails in a body represents the collar, defined by the mold space D and the ½″ gap between the ends of the base and web portions, and forms a fusion weld of all those portions of the rail ends below the line I, I, and the slag in engagement with the under portions of the rail heads and also with all of the faces of the heads on either side of the mold extensions O heats the heads to the high temperature necessary to form a pressure weld between the abutting surfaces. As indicated, the inner walls of the mold sections at or about the tread and gauge faces of the rail ends are either in close juxtaposition to such surfaces or in actual contact therewith to prevent access of the molten slag to said surfaces, thereby obviating the superheating of these portions of the rail ends to a point where they would tend to fuse or wash away. The molten slag being confined to the basin E, the maximum heat is, therefore, concentrated near the center of said basin and is delivered to the material of the rail heads through the faces not shielded by the mold extensions O, O and is evenly distributed throughout the heads, raising the latter to a proper temperature for pressure welding, but not to a temperature which would cause them to fuse or wash away at any of the working faces of said heads, the contour of the top and sides of the rails being preserved unimpaired and a perfect fusion weld between the adjacent faces of the rail heads being insured, while the bases and webs of the rail will be homogeneously joined by a complete fusion weld.

It will be apparent that it is not necessary that the mold portions adjacent the tread and gauge faces of the rail heads be in actual contact with said faces, as it will suffice if the mold surfaces are in such proximity as to prevent access of any appreciable quantity of the molten slag to these faces.

As indicated, the slag basin is so proportioned as to distribute the molten slag in contact with a relatively large area of the under faces and the unshielded tread and gauge faces of the rail heads, so that the heat from the slag will be distributed to the rail heads and will bring the abutting ends of the rail heads quickly to a temperature sufficient to effect a thorough, homogeneous pressure weld between said heads.

What I claim is:

1. The method of welding railway rails, which comprises fusion welding the bases and webs by contact with alumino-thermic steel, pressure welding the heads under heat from the slag of the alumino-thermic reaction, and shielding portions of the tread and gauge faces of the rail from contact with said slag.

2. The method of welding railway rails, which comprises enclosing the rail ends in a mold, filling the mold space about the bases and webs of the rails with alumino-thermic steel and the spaces adjacent the rail heads with the slag of the alumino-thermic reaction, shielding portions of the tread and gauge faces of the rails from contact with said slag by engaging said faces with interior walls of the mold, and pressure welding the heads under heat from the alumino-thermic slag.

3. A mold for welding rails adapted to surround and enclose the ends of the rails, having a cavity about the ends of the rails and wall sections shielding portions of the tread and gauge faces of the rails within the mold from contact with the molten welding medium.

4. A mold for welding rails adapted to surround and enclose the ends of the rails, having a cavity about the ends of the rails and inwardly extending wall sections in engagement with portions of the tread and gauge faces of the rail ends within the mold.

5. Means for welding railway rails, comprising a mold to surround and enclose the ends of the rails, and means for shielding portions of the tread and gauge faces of the rails within the mold from contact with the molten welding medium.

In testimony whereof I affix my signature.

EDWARD F. BEGTRUP.